UNITED STATES PATENT OFFICE.

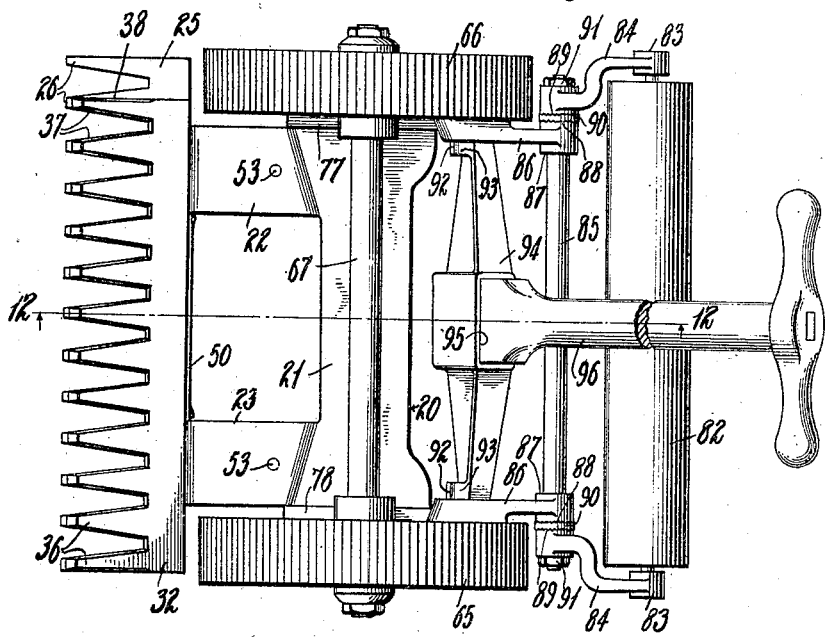
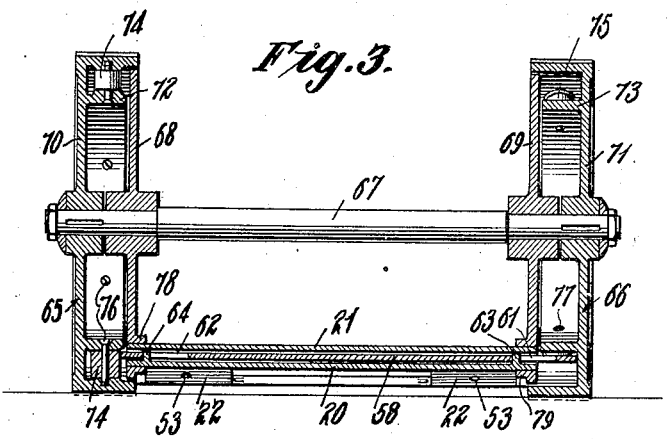

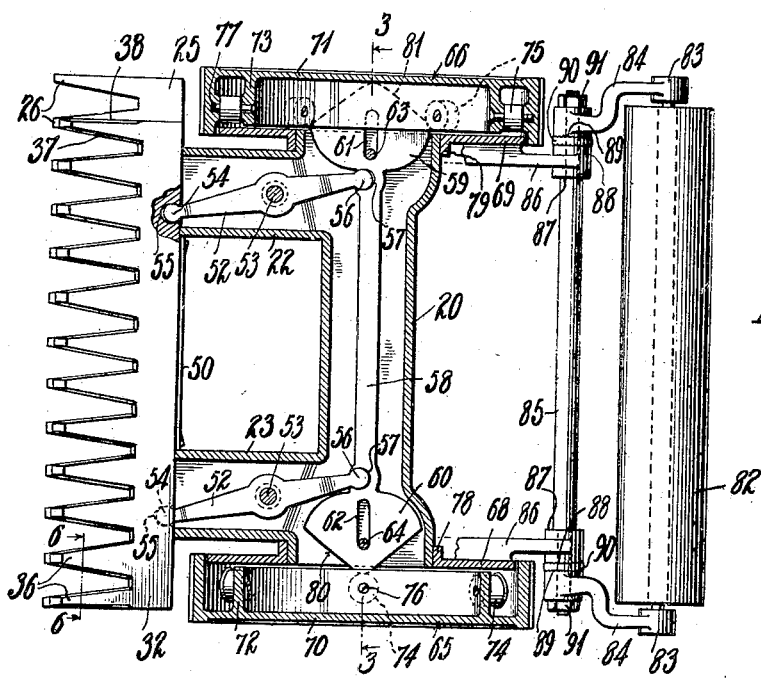

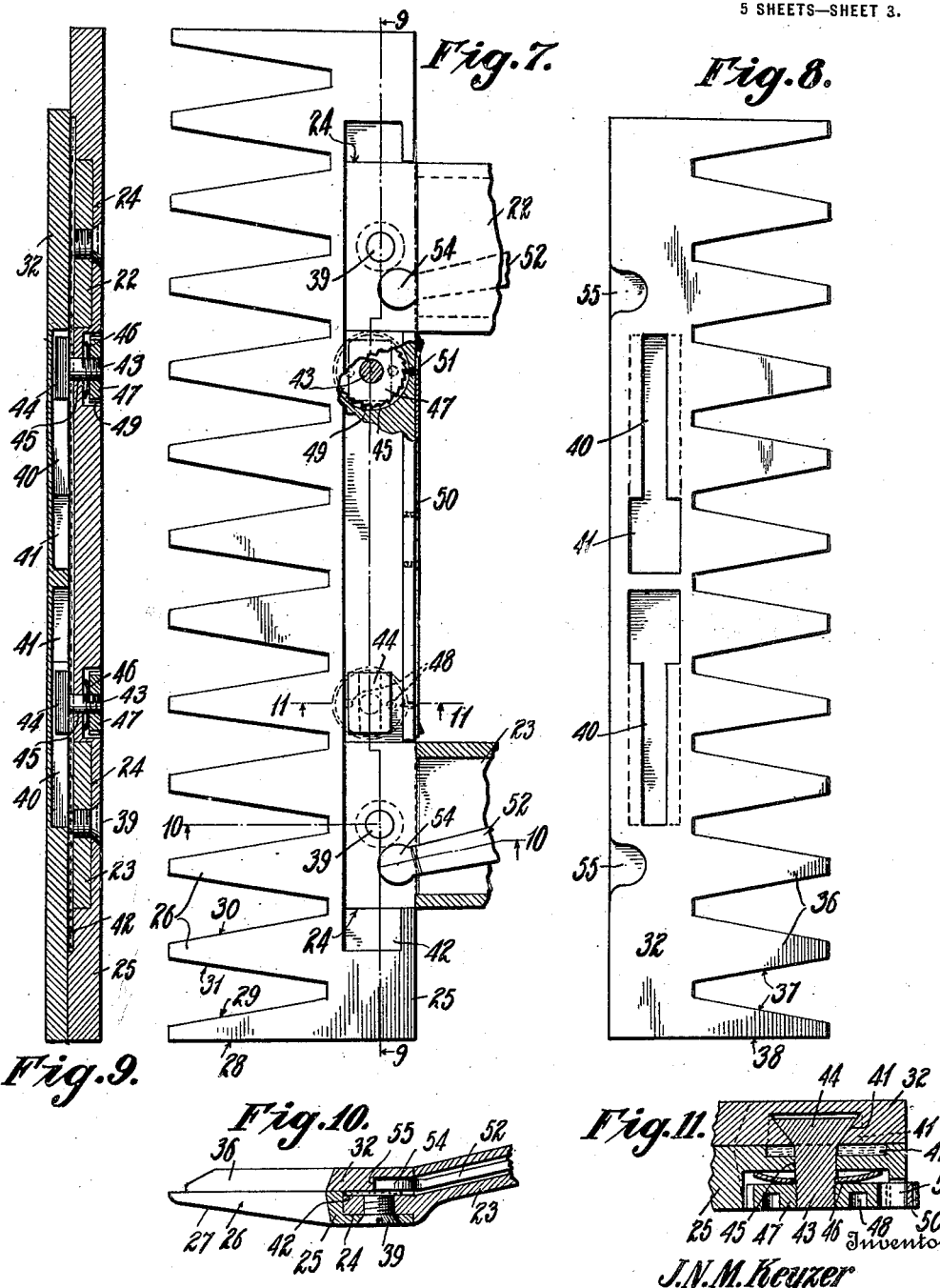

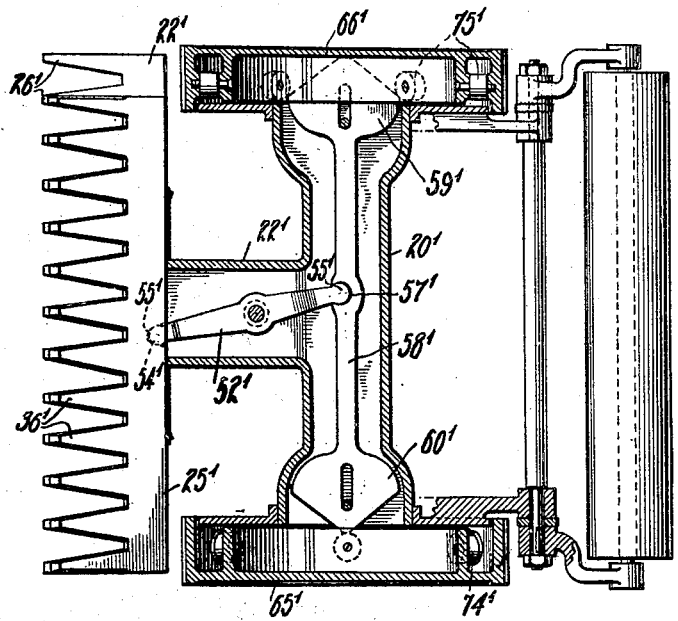
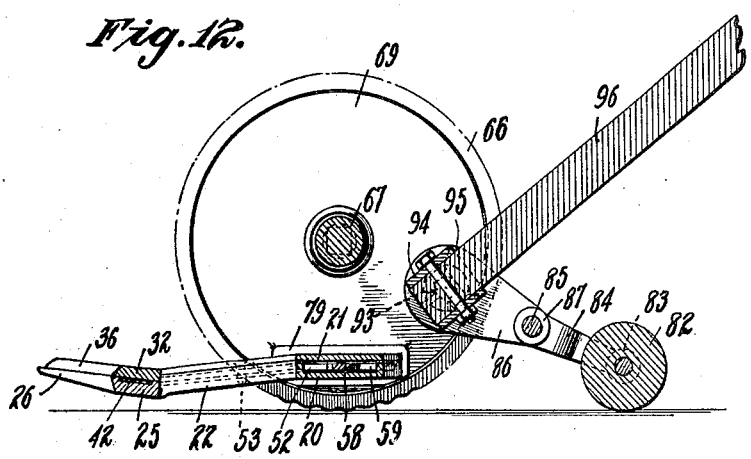

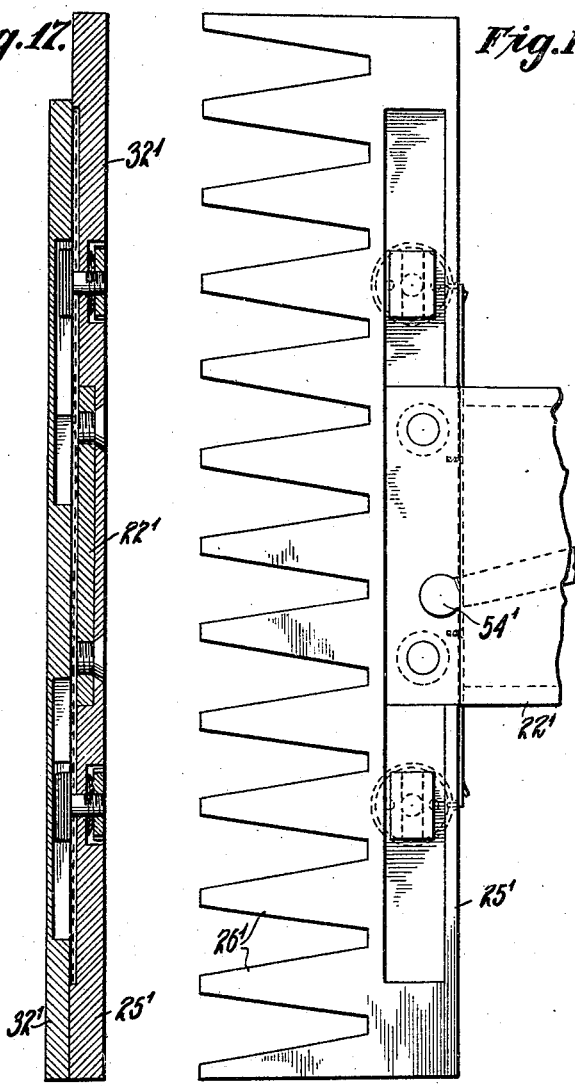

JOSEPH N. M. KEYZER, OF LYNCHBURG, VIRGINIA.

LAWN MOWER.

1,417,252.  Specification of Letters Patent.  Patented May 23, 1922.

Application filed August 5, 1920. Serial No. 401,323.

*To all whom it may concern:*

Be it known that I, JOSEPH N. M. KEYZER, a citizen of the United States, residing at Lynchburg, in the county of Campbell, State of Virginia, have invented certain new and useful Improvements in Lawn Mowers; and I do hereby declare the following to be a full, clear, and exact description of the invention, such as will enable others skilled in the art to which it appertains to make and use the same.

This invention relates to cutting machines in general and while I have elected to illustrate the various features of the invention embodied in a lawn mower, it will be understood from the following description that certain of these features may be utilized in other mechanisms, such as hair clippers.

The objects of the present invention include the provision of a structure in which the surfaces that slide over the surface from which projects the material to be cut, are free from obstructions of every kind and in which, furthermore, there are no projections against which may lodge the material that has been cut.

A further object of the invention is to provide a manner of connecting the correlatively fixed and movable cutting elements, that will preclude access of foreign matter between the working faces and into position to interfere with the operation of other moving parts.

An additional object is to provide a cutter that may be operated to cut a swath completely up to a wall or other border line, and in which, furthermore, the movable knife bar will be positively actuated with a minimum of friction and a maximum of efficiency under every condition.

It is also an object of the invention to provide a construction in which the adjustment that effects the desired height of the stubble, will ensure an even height at all points transversely of the cutting mechanism.

Other objects and advantages of the invention will be apparent from the following description:

Figure 1 is a top plan view showing an embodiment of the present invention including two knife actuating rocker arms.

Figure 2 is a view similar to Figure 1 but with the bull wheels, the main frame and other portions in section to better illustrate the working parts.

Figure 3 is a vertical section through a mower in the plane of the main shaft, and on line 3—3 of Figure 2.

Figure 4 is an inner face view of the bull wheel at the right hand side of the mower in Figure 2, illustrating the arrangement of the anti-friction rollers.

Figure 5 is a face view of the bull wheel at the left of the mower as shown in Figure 2 and illustrating how that the anti-friction rollers of one bull wheel have their axes in planes intermediate the planes of the axes of the rollers of the other bull wheel.

Figure 6 is a section on line 6—6 of Figure 2 and showing the bevels of the knives.

Figure 7 is a top plan view, partly in section, showing the lower knife bar and its knives and directly associated parts.

Figure 8 is a bottom plan view of the top knife bar and its knives, the top knife bar being shown as laid back from over the bottom knife bar.

Figure 9 is a section taken longitudinally through the knife bars, assembled.

Figure 10 is a section on line 10—10 of Figure 7, showing the manner of connecting an arm of the main frame with the bottom knife bar and the position of a rocker in the frame arm and engaged in the rear portion of the upper knife bar.

Figure 11 is a section on line 11—11 of Figure 7, showing the manner of holding the upper knife bar slidably upon the lower knife bar and the means for exerting yieldable tension between the knife bars and their knives for effecting an efficient cut.

Figure 12 is a section on line 12—12 of Figure 1.

Figure 13 is a detail view showing a portion of the bottom of the lower knife bar and the knife, the corresponding ratchet nut being illustrated as also a portion of a spring retaining pawl.

Figure 14 is a view similar to Figure 2 but showing a construction in which the main frame has a single hollow arm and the reciprocatory knife bar is actuated through the medium of a single rocker.

Figure 15 is a view similar to Figure 7, illustrating the lower knife bar with associated parts, of the structure illustrated in Figure 14.

Figure 16 is a view similar to Figure 8 but illustrating the under side of the upper knife bar with its knives and showing the single socket to receive the single actuating rocker.

Figure 17 is a view similar to Figure 9, taken longitudinally through the assembled knife bars that are shown in Figures 15 and 16.

Referring now to the drawings, in which the invention is illustrated, as embodied in a lawn mower, there is shown in Figure 1 a structure comprising a substantially U-shaped frame including a hollow body portion 20 provided with a cover plate 21 and from the end portions of which body portion there project forwardly the tubular arms 22 and 23.

The forward ends of the tubular arms enter sockets 24 that are formed in the upper face and open through the rear face of the lower knife bar 25 from the forward edge of which there project the integral knives 26. Each of the knives 26 has its lower face 27 beveled so that the forward end of the knife is of less thickness than the rear end and each of these knives is also tapered forwardly. The endmost knives have their outer faces 28 vertical while their inner faces 29 diverge upwardly from their faces 28. The side faces 30 and 31 of each of the inner knives, diverge upwardly from the vertical. Furthermore, the endmost knives are substantially right-triangular in plan while the inner knives are substantially isosceles-triangular in plan. It is the upper inner edges only of the outer knives that are cutting edges while the upper outer edges of the outer knives are disposed in the direction of advance of the mower and may be operated close to a wall or other border while cutting, so as to cut a swath directly up thereto. While the outer knives have cutting edges at one side only, both upper side edges of each of the inner knives are cutting edges.

Slidably disposed upon the knife bar 25 is a reciprocatory knife bar 32 that is somewhat shorter than the knife bar 25 and from which project forwardly the knives 36. The endmost knives 36 correspond in plan to the inmost knives 26 while the inner knives 36 correspond in plan to the inner knives 26. These knives are so arranged and proportioned that when one endmost knife 36 coincides with the corresponding endmost knife 26, the other endmost knife 36 will lie upon the first of the inner knives 26 at the other end of the knife bar 25 and with the lower edge of its slanting face 37 coinciding with the corresponding edge of the said knife 26. At this time the outer straight face 38 of this endmost knife 36 will lie inwardly beyond the outer side face of the corresponding knife 26, as illustrated in Figure 2 of the drawings. This is one limit of movement of the knife bar 32 upon the bar 25. The other limit of such movement is when the outer face 38 coincides with the outer face of the knife 26 at that end of the bar 25.

The forward ends of the arms 22 and 23 are held within the sockets 24 through the medium of screws 39 that are engaged through the bottoms of the sockets and into the arms, these screws being flush with the under face of the knife bar 25.

As shown in Figure 10 of the drawings, which illustrates the forward portion of one of the arms that are duplicates, the arms extend above the upper face of the bar 25 and their side and top walls terminate against the rear face of the upper knife bar 32. As shown in Figure 8 of the drawings the upper knife bar 32 is provided with spaced longitudinally extending dove-tailed slots 40 which at their mutually adjacent ends have their side walls cut away with resultant rectangular recesses 41 that open through the bottom of the knife bar. In the upper face of the lower knife bar 25 there is formed a longitudinal channel 42 that constitutes a grease pan to contain a lubricant and through the bottom of this channel are passed the threaded stems 43 of dove-tailed guide blocks 44 that slidably engage the dove-tailed slots 40 above referred to. These guide blocks 44 are entered through the enlargements 41 and then slide into the slots 40. The knife bar 32 is then placed upon the knife bar 25 with the stems 43 passing through the perforations 45 in the bottom of the aforesaid channel or grease pan 42. The perforations 44 are counter-sunken at the under side of the knife bar 25 to receive dished spring washers 46, the concaved faces of which are disposed against the tops of the countersinks and upon the threaded stems 43 are screwed the annular nuts 47 that serve to tension the washers 46 and by drawing the guide blocks 44 downwardly against the correspondingly converged walls of the slots 40, determine the frictional contact between the knife bars and between the upper and lower knives. The annular nuts 47 are provided with sockets 48 to receive a tool for manipulating them and these nuts are furthermore provided with ratchet peripheries 49 that cooperate with a spring plate 50 that is secured against the rear face of the lower knife bar 25 and has pawls 51 struck therefrom in position to engage the said ratchet peripheries and hold the nuts from unscrewing.

To reciprocate the knife bar 32 upon the knife bar 25, a rocker 52 is pivotally mounted in each of the frame arms 22 and 23, upon a pin 53 passed vertically through the arm.

The forward end of each rocker is rounded as shown at 54 and is engaged in a correspondingly shaped recess 55 that opens through the rear face of the knife bar 32 and through its bottom, as clearly shown in Figure 3. The other ends of the rockers extend through the arms 22 and 23 respectively, and in the body 20 of the casing frame where each has an enlarged rounded terminal 56 that works in a correspondingly shaped recess 57 in the forward edge of a reciprocatory rocker actuating bar 58. The bar 58 is disposed transversely of the frame and has the enlarged terminal heads 59 and 60 that are longitudinally slotted as illustrated at 61 and 62 to receive guide pins 63 and 64 that direct the bar 58 in its reciprocatory movement.

The bar 58 is reciprocated from the bull wheels 65 and 66 of the mower. These bull wheels are fixed to the reduced end portions of the main shaft 67 upon which reduced portions are also mounted the hubs of cover plates 68 and 69 that lie within the inner edge portions of the peripheries of the bull wheels and provide chambers between them and the bull wheels. The webs 70 and 71 that support the rims of the bull wheels at their outer edges, are provided with flanges 72 and 73 respectively between which and the corresponding wheel rims are disposed the anti-friction rollers 74 and 75 respectively, carried by pins 76 and 77 that are engaged radially through the flanges and the wheel rims.

The shaft 67 rotates in the central hubs of the cover plates 68 and 69 and these plates, below the shaft 67, are provided with flanges 78 and 79 respectively, that provide sockets in which are seated the corresponding ends of the body 20 of the main frame. The bull wheels hold the cover plates against movement away from each other and thus prevent the flanges 78 and 79 from drawing off from the ends of the frame 20.

Upon reference to Figures 4 and 5 it will be noted that the axes of the rollers 74 are in planes midway between the planes of the axes of the rollers 75. The heads 59 and 60 of the rocker actuating bar 58 each have their outer ends formed with outwardly convergent straight faces 80 and 81 respectively, providing cams and these heads operate through slots 82 and 83 respectively, formed through the cover plates 68 and 69 respectively, so that the convergent cammed faces of the heads may lie between the corresponding anti-friction rollers. As the lawn mower is advanced and the bull wheels are rotated, with the parts starting from the positions shown in Figure 2, a roller 75 in its movement rearwardly of the lawn mower bears against the front one of the faces 80 and forces the bar 58 in the direction of the opposite bull wheel. At the same time, a roller 74 that is directly opposite the line of convergence of the faces 81, moves rearwardly so that the rear convergent face 81 passes behind it, thus bringing the front face 81 into final position with the next roller 74 against the base portion of the said front face 81. This last named roller 74 then presses against the said front face 81 and moves the bar 58 in the opposite direction, whereby the rockers 52 are actuated.

To support the rear portion of the mower there is provided a roller 82 having a shaft 83 that is journaled at its ends in the arms 84 which latter are engaged and keyed upon the reduced end portions of a clamping rod 85. Extending rearwardly and downwardly from each cover plate 68 and 69, is a bracket 86, these brackets having perforations that aline transversely of the machine and in which are received the reduced end portions of the clamping rod 85, the ends of the brackets being disposed against the shoulders 87 at the bases of these reduced end portions. The mutually adjacent faces of the portions of the arms and brackets that engage the reduced end portions of the rod 85 are serrated as illustrated at 88 and 89 respectively, and between these serrated faces are disposed yieldable washers 90 into which the serrations bite, when the engaged arm ends are drawn toward each other by manipulation of the terminal nuts 91.

By reason of the fact that the arms 84 are keyed to the rod 85 and thus cannot rotate with respect to the rod, the rear ends of the arms and therewith the shaft 83 and rollers 82 move in unison and thus in an adjustment of the roller 82 to cause the knives to cut higher or lower, it is never possible to give one end of the roller greater adjustment than the other.

In the inner end portions of the brackets 86 are sockets 92 in which are engaged the trunnions 93 at the ends of an oscillatory head 94 having a central socket 95 in which is received the stem 96 of a handle for manipulating the mower.

Referring now more particularly to the structure shown in Figures 14 to 17, inclusive, of the drawings, the main frame 20' has a single hollow arm 22' in which there is mounted a rocker 52' having its rear rounded end portion 55' engaged in a correspondingly shaped recess 57' in a reciprocatory rod 58'. This rod 58' has the enlarged heads 59' and 60' provided with cam faces that cooperate with anti-friction rollers 74' and 75' that are carried by the bull wheels 65' and 66', the same as in the structure previously described.

The arm 22' is engaged with the lower knife bar 25' in the same manner as are each of the arms 22 and 23 previously described, the knife bar having knives 26' and having slidably disposed upon it and its knives, the knife bar 32' and knives 36' as in the previously described structure, the mechanism for holding these knives yieldably and slidably together, being the same as that previously referred to. Where reference numerals are found on these last named figures of the drawings, corresponding to reference numerals on the first described figures with prime marks, they refer to parts that are the same as parts of the previously described structure that have the identical reference numerals without prime markings.

The rocker arm 52' has a rounded forward end portion 54' that engages in a recess 55' formed through the rear edge and the bottom face of the upper knife bar 32' so that as the rocker 52' is actuated, the upper knife bar is reciprocated.

It will be noted upon reference to Figure 10 of the drawings that the bottom faces of the lower knives slant upwardly and forwardly from the bottom knife bar and furthermore, that both the lower faces of the bottom knife bar and its knives and the upper faces of the upper knife bar and its knives are entirely without obstructions of any kind while the connected forward ends of the arms of the main frame, do not project beyond the upper and lower surfaces respectively, of the upper and lower bars. Thus, there is nothing for lodgment of grass as it is cut nor is there anything to engage and hang against the surface over which the apparatus is moved.

What is claimed is:

1. A mowing machine comprising a main frame including a hollow body having a hollow arm extending therefrom, bull wheels supporting the frame, a knife bar having a socket, the frame arm having an extension held in the socket, knives carried by the bar, a second knife bar slidably mounted upon the first knife bar and having knives in cooperative relation to the first named knives, a socket in the upper knife bar communicating with the hollow arm, a rocker pivoted within the arm and engaged at one end in the socket of the upper knife bar, and means for rocking the rocker from the bull wheels.

2. In a cutting mechanism of the class described, a lower knife bar having an oil holding recess in its upper face and provided with knives, a second knife bar slidably mounted upon the first knife bar in position to close the recess, the upper knife bar having a socket opening into the recess to receive oil therefrom, the second knife bar having knives in cooperative relation to the first named knives, and means movably connected with the upper knife bar through the medium of said recess, for reciprocating the upper knife bar upon the lower knife bar.

3. A cutting mechanism comprising a pair of knife bars having cooperative knives and slidably disposed one upon the other, one of the bars having dove-tailed slots extending longitudinally of it and recesses communicating with the ends of the slots and retaining blocks passed through the recesses and into the slots respectively, and held in the other of the knife bars.

4. A cutting mechanism comprising a pair of knife bars having cooperative knives and slidably disposed one upon the other, one of the bars having dove-tailed slots extending longitudinally of it and recesses communicating with the ends of the slots and retaining blocks passed through the recesses and into the slots respectively, and held in the other of the knife bars, the blocks having means associated therewith for drawing them and therewith their knife bar and its knives in the direction of the other knife bar and its knives.

5. A cutting mechanism comprising a pair of knife bars having cooperative knives and slidably disposed one upon the other, one of the bars having dove-tailed slots extending longitudinally of it and recesses communicating with the ends of the slots and retaining blocks passed through the recesses and into the slots respectively, and held in the other of the knife bars, the blocks having means associated therewith for yieldably drawing them and their knife bar and its knives in the direction of the other knife bar and its knives.

6. A cutting mechanism comprising a knife bar having knives and provided with an oil holding recess in its upper face, a second knife bar having knives and disposed upon the first named knife bar and over its recess, the second knife bar having longitudinal dove-tailed slots communicating with the recess of the other bar to receive oil therefrom, and means slidably engaged in the dove-tailed slots and held to the other of the knife bars for holding the knife bars in cooperative slidable relation.

7. A cutting mechanism comprising upper and lower slidably connected knife bars having cooperative knives, one of the bars having an inwardly broadened longitudinal channel and the other bar having an opening therethrough communicating with the channel, a guide block slidably engaged in the channel and having a stem passed through the opening of the other of the knife bars and threaded, said other knife bar having a recess in which said threaded portion is received, a spring washer within the recess upon the threaded stem and a nut engaged with the threaded stem and between which and the bottom of the recess the spring washer is held, whereby to tension the knife bars with respect to each other.

8. A lawn mower comprising mutually reciprocatory knife bars and their cooperating knives, a frame fixed to one of the knife bars, supporting wheels for the frame having radially disposed anti-friction rollers, the axes of the rollers of one wheel being in planes alternating with those of the axes of the rollers of the other wheel, a reciprocatory bar within the frame having enlarged ends provided with convergent faces disposed respectively for engagement by the corresponding anti-friction rollers alternately with resultant reciprocation of the bar and connections between the reciprocatory bar and a knife bar for reciprocating the latter.

In testimony whereof, I affix my signature, in the presence of two witnesses.

JOSEPH N. M. KEYZER.

Witnesses:
M. J. HOYLMAN,
F. L. OWEN.